United States Patent [19]

Grane

[11] 3,832,395

[45] Aug. 27, 1974

[54] METHOD FOR THE PRODUCTION OF PHTHALIC AND TOLUIC ACIDS BY THE CATALYTIC OXIDATION OF XYLENES

[75] Inventor: Henry R. Grane, Springfield, Pa.

[73] Assignee: Atlantic Richfield Company, Philadelphia, Pa.

[22] Filed: Dec. 18, 1972

[21] Appl. No.: 316,186

[52] U.S. Cl. .......................................... 260/524 R
[51] Int. Cl.. C07c 51/20, C07c 63/26, C07C 63/02
[58] Field of Search ................................ 262/524 R

[56] References Cited
UNITED STATES PATENTS

| | | | |
|---|---|---|---|
| 2,245,528 | 6/1941 | Loder | 260/524 R |
| 3,452,087 | 6/1969 | Patton et al. | 260/524 R |
| 3,507,912 | 4/1970 | Behun et al. | 260/524 R |
| 3,732,314 | 5/1973 | Massie | 260/524 R |

Primary Examiner—Lorraine A. Weinberger
Assistant Examiner—Richard D. Kelly
Attorney, Agent, or Firm—Delbert E. McCaslin

[57] ABSTRACT

Method for the production of phthalic and toluic acids by the catalytic oxidation of a xylene or a mixture of the xylene isomers utilizing air or gas containing molecular oxygen as the primary oxidation agent in conjunction with an isobutane oxidate as a secondary agent. A cobalt salt is the preferred catalyst; however, the salts of metals having atomic numbers 23 – 29 inclusive, can be utilized. The oxidation is carried out at temperatures in the range of from about 220°F. to 320°F., at pressures ranging from 100 to 1,000 psig.

8 Claims, No Drawings

METHOD FOR THE PRODUCTION OF PHTHALIC AND TOLUIC ACIDS BY THE CATALYTIC OXIDATION OF XYLENES

BACKGROUND OF THE INVENTION

Processes for producing mono- and dicarboxylic aromatic acids by the use of air oxidation are well-known, in particular processes for producing terphthalic acid and isophthalic acid and the corresponding toluic acids are known utilizing acetic acid as a solvent. In other similar processes bromine is employed as a promoter together with the acetic acid as the solvent and in other known processes aldehydes or ketones are employed as promoters. All of these processes suffer from a common disadvantage, namely, they are highly corrosive and require the use of expensive alloys in the reactor and processing equipment, but in spite of these precautions against corrosion, such processes are subject to frequent shutdowns because of corrosion and allied problems.

The present invention avoids the use of corrosive solvents or promoters and is amenable to batch, semi-continuous or continuous operation.

SUMMARY OF THE INVENTION

In accordance with the process of this invention a single xylene isomer or a mixture of two or more of the isomers is reacted with air or molecular oxygen in the presence of an oxidate produced by the oxidation of isobutane with molecular oxygen and in the presence of a metal salt as the catalyst wherein the metal is selected from those of atomic numbers 23 – 29 inclusive of the Periodic Table, preferably however, a cobalt catalyst. The xylene or xylenes together with the metal catalyst are charged to a reactor and after purging with an inert gas such as nitrogen, the contents are heated to the reaction temperature and air flow started under the desired pressure. The isobutane oxidate from which the unreacted isobutane was stripped is then introduced into the reactor and the air or oxygen flow continued until the desired conversion has been attained. High yields of phthalic and toluic acids are achieved by this method. The isobutane oxidate which is composed primarily of a mixture of tertiary butyl hydroperoxide and tertiary butyl alcohol is generally substantially completely reduced to tertiary butyl alcohol which can be recovered and utilized as such or dehydrated to isobutylene another valuable product.

It is an object of this invention therefore to provide a method for the catalytic oxidation of xylenes to produce phthalic acids and toluic acids, wherein the use of corrosive solvents or promoters is avoided.

It is another object of this invention to provide a method for the production of phthalic acids and toluic acids by the catalytic oxidation of xylenes employing air and an isobutane oxidate in the presence of a metal salt as the catalyst.

It is another object of this invention to provide a method for the oxidation of a xylene isomer or a mixture of the xylene isomers to produce the corresponding phthalic acid or toluic acid or mixtures of such acids utilizing air and isobutane oxidate and a cobalt catalyst.

Other objects of this invention will be apparent from the description which follows and from the claims.

DESCRIPTION OF THE INVENTION

This invention is applicable to the oxidation of ortho-, meta- or para-xylene or mixtures of two or more of these isomers. The products are the corresponding phthalic acids and toluic acids. The oxidation is preferably carried out by bringing a mixture of the xylene or xylenes with the catalyst to the desired reaction temperature and then introducing a molecular oxygen gas, preferably air into the reaction mixture. The air flow is maintained at a rate to hold about 7 weight per cent oxygen in the off-gas when a pressure of about 500 psig is employed. Reaction temperatures of from 220° F. to 320° F. can be employed with temperatures ranging from 240° F. to 300° F. being preferred and with temperatures of from 270°F. to 290° F. being most preferred. Pressures of from 100 to 1,000 can be used with 400 to 600 psig being preferred and about 500 psig being convenient.

The isobutane oxidate is then introduced into the reactor system along with the air flow while maintaining the aforementioned temperatures, pressures and oxygen content in the off-gas from the reactor.

The isobutane oxidate is preferably prepared by the continuous non-catalytic oxidation of isobutane with air or oxygen at temperatures in the range of 200°F. to 300°F. and pressures from 200 to 1,000 psig with times ranging from 1 to 20 hours. It is preferred to strip the isobutane oxidate with tertiary butanol to remove the unreacted isobutane. The oxidate is then composed primarily, i.e., generally about 95 weight per cent of a mixture of teriary butyl hydroperoxide and tertiary butyl alcohol with the tertiary butyl hydroperoxide preferably in molar excess over the alcohol, depending upon the conditions employed in oxidation. The 5 per cent by-products are also oxygenated products and are primarily small amounts, i.e., of the order of 1 per cent or less of water, methyl alcohol, acetone, esters and the like. These are in such small amounts it is unnecessary to remove them from the oxidate since they do not interfere with the reaction. The production of the isobutane oxidate suitable for use in this reaction is fully described in the U.S. Pat. Nos. 2,845,461 (1958) and 3,478,108 (1969).

The xylene oxidation is carried out for a time ranging from 0.25 to 10.0 hours. The catalysts suitable for use in the invention are those having atomic numbers of from 23 to 29 inclusive, i.e., vanadium chromium, manganese, iron, cobalt, nickel and copper, with cobalt being preferred. The salts may be either organic or inorganic, such as the naphthenates, acetyl acetonates, halides, sulfates and the like, with the soluble organic salts being preferred. The quantity of catalyst can range from 20 parts per million by weight of the metal based on the weight of the xylenes and the oxidate ranging up to 10,000 parts per million by weight of the metal, or the solubility limit of the catalyst. It is preferred that the oxygen content be maintained below about 10 weight per cent based on the weight of the reactants in order to stay outside the explosive range. No solvent is required other than the aforementioned isobutane oxidate which contains an appreciable quantity of tertiary butyl alcohol.

In order to illustrate the invention in greater detail the following Example is provided.

EXAMPLE

To a 1 liter autoclave were added 69 grams of meta-xylene and sufficient cobalt acetyl acetonate to give 185 ppm by weight cobalt in the mixture. The autoclave was nitrogen purged and heated to 280°F. Air flow was then started to the reactor at a rate sufficient to hold about 7 weight per cent oxygen in the off-gas with a pressure of 500 psig. Over a 1 hour period 420 grams of isobutane oxidate was charged to the reactor while maintaining the temperature at 280°F., the pressure at 500 psig with 7 weight per cent oxygen in the off-gas. The oxidate also contained 185 ppm by weight cobalt as cobaltacetyl acetonate in order to maintain a constant catalyst concentration during the run. After the 1 hour addition period the oxidate flow was stopped but the air flow was continued for 1 additional hour before the reactor was cooled to room temperature. After depressurizing the reactor, the contents were analyzed and it was found that 89.9 weight per cent of the xylene had been converted. Isophthalic acid amounted to 21 weight per cent of the converted xylene and meta-toluic acid amounted to 76 weight per cent of the converted xylene in the reaction product. These results show that a high conversion and high selectivity can be obtained by the process of this invention.

The isobutane oxidate utilized in this Example was prepared by the continuous non-catalytic oxidation by isobutane with air at 272°F., 435 psig with an average residence time of 6 hours. The oxygen in the off-gas was held at less than 5 per cent by weight. The oxidate was stripped with tertiary butanol to remove the unreacted isobutane and the stripped oxidate was used in the above described Example.

I claim:

1. A process for producing phthalic and toluic acids which comprises contacting a hydrocarbon selected from the group consisting of ortho-, meta-, and para-xylene and mixtures thereof at a temperature in the range of from 220°F. to 320°F. with a molecular oxygen-containing gas under pressures ranging from 100 to 1,000 psig solely in the presence of a metal salt catalyst and an oxidate produced by the thermal oxidation of isobutane with molecular oxygen, said oxidate comprising primarily a mixture of tertiary butyl hydroperoxide and tertiary butyl alcohol, the metal of the said catalyst being selected from the group consisting of vanadium, chromium, manganese, iron, copper, nickel and cobalt.

2. The method according to claim 1, wherein the catalyst is a cobalt catalyst.

3. The method according to claim 2, wherein the hydrocarbon is meta-xylene and there is produced isophthalic acid and meta-toluic acid.

4. The method according to claim 2, wherein the hydrocarbon is para-xylene and there is produced terphthalic acid and paratoluic acid.

5. The method according to claim 1, wherein the temperature is in the range of from 240°F. to 300°F. and the pressure is in the range of 400 to 600 psig.

6. The method according to claim 5, wherein the catalyst is cobalt acetyl acetonate.

7. The method according to claim 1, wherein the hydrocarbon is contacted with air as the molecular oxygen-containing gas, the temperature is in the range of from 270°F. to 290°F., the pressure is about 500 psig, the oxidate comprises primarily about 95 weight per cent of a mixture of tertiary butyl hydroperoxide and tertiary butyl alcohol, and the catalyst is cobalt acetyl acetonate.

8. The method according to claim 7, wherein the the hydrocarbon is meta-xylene, and there is produced a mixture of isophthalic acid and meta-toluic acid.

* * * * *